C. FEY.
Malt-Plow.
No. 207,495.  Patented Aug. 27, 1878.
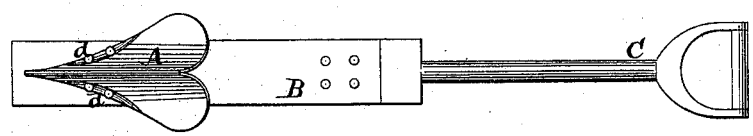
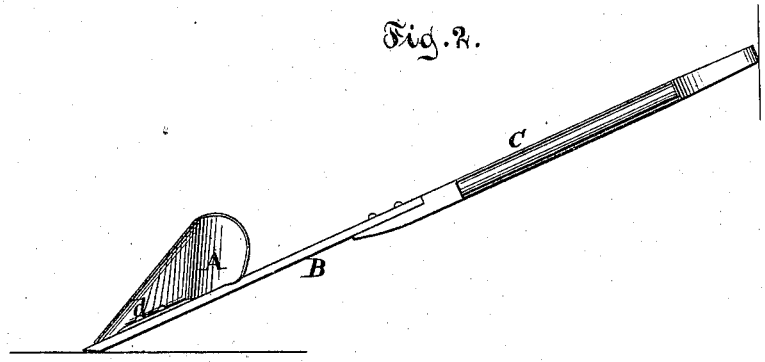

UNITED STATES PATENT OFFICE.

CHARLES FEY, OF BROOKLYN, NEW YORK.

IMPROVEMENT IN MALT-PLOWS.

Specification forming part of Letters Patent No. 207,495, dated August 27, 1878; application filed March 13, 1878.

*To all whom it may concern:*

Be it known that I, CHARLES FEY, of Brooklyn, in the county of Kings and State of New York, have invented a new and Improved Malt-Plow, which invention is fully set forth in the following specification, reference being had to the accompanying drawing, in which—

Figure 1 represents a plan or top view of my plow. Fig. 2 is a side view thereof.

Similar letters indicate corresponding parts.

My invention has reference to a plow which is especially designed for use in agitating or stirring up malt in the process of drying the same; and it consists in the combination of a plowshare, a supporting-plate, and a handle, the plowshare being affixed to the supporting-plate, and the latter being formed on or secured to the handle in such a manner that when the whole is moved over a floor containing malt, the malt is thrown both in an upward and in a lateral direction by the action of the plowshare, and hence it is very thoroughly stirred up, and with great ease and facility.

In the drawing, the letter A designates the share of my plow. B is the supporting-plate, and C is the handle.

The plowshare A is made of the usual shape of such articles, and it is secured to the supporting-plate B by means of rivets $d$, or in any other suitable way.

The supporting-plate B, in the example shown, has an oblong shape, and it is secured at its rear end to the shank of the handle C by any suitable means, or it may be formed in one piece with the latter.

The handle C is preferably made of the general form of handles commonly used on scoops or shovels. In stirring up malt in drying-rooms an ordinary shovel is usually employed, so that a great amount of labor is required in order to effect the desired object.

By my plow both time and labor are saved, inasmuch as, when the plow is moved over the floor covered with malt, the malt is thrown in various directions by the action of the plowshare A, and furrows are drawn, exposing a portion of the floor to the air, so that the same is cooled before it becomes again covered with malt.

It may be remarked that the plowshare A can be made single-acting instead of double-acting, as in the example shown, without departure from my invention.

What I claim as new, and desire to secure by Letters Patent, is—

The combination, in a malt-plow, of a plowshare, A, a supporting-plate, B, and a handle, C, substantially as shown and described.

In testimony that I claim the above as my invention I have hereunto set my hand and seal this 16th day of April, 1877.

CHARLES FEY. [L. S.]

Witnesses:
ADOLF TERPENTE,
W. HAUFF.